(12) United States Patent
Lai et al.

(10) Patent No.: US 8,499,174 B2
(45) Date of Patent: Jul. 30, 2013

(54) METHOD AND CONTROLLER FOR POWER MANAGEMENT

(75) Inventors: Jiin Lai, Taipei (TW); Chung-Che Wu, Taipei County (TW)

(73) Assignee: VIA Technologies, Inc., New Taipei (TW)

( * ) Notice: Subject to any disclaimer, the term of this patent is extended or adjusted under 35 U.S.C. 154(b) by 818 days.

(21) Appl. No.: 12/358,412

(22) Filed: Jan. 23, 2009

(65) Prior Publication Data

US 2010/0064158 A1  Mar. 11, 2010

Related U.S. Application Data

(60) Provisional application No. 61/095,029, filed on Sep. 8, 2008, provisional application No. 61/095,032, filed on Sep. 8, 2008.

(51) Int. Cl.
  *G06F 1/00* (2006.01)
(52) U.S. Cl.
  USPC ........................................... 713/300
(58) Field of Classification Search
  USPC .................. 713/300, 310, 320; 711/161, 162, 711/147
  See application file for complete search history.

(56) References Cited

U.S. PATENT DOCUMENTS

| | | | | |
|---|---|---|---|---|
| 6,393,584 B1 * | 5/2002 | McLaren et al. | | 714/14 |
| 6,438,668 B1 * | 8/2002 | Esfahani et al. | | 711/165 |
| 6,546,472 B2 * | 4/2003 | Atkinson et al. | | 711/156 |
| 6,609,182 B1 * | 8/2003 | Pedrizetti et al. | | 711/159 |
| 6,691,234 B1 * | 2/2004 | Huff | | 713/300 |
| 7,020,040 B2 * | 3/2006 | Lin | | 365/229 |
| 7,100,037 B2 * | 8/2006 | Cooper | | 713/2 |
| 7,143,248 B2 * | 11/2006 | Bress et al. | | 711/154 |
| 7,523,323 B2 * | 4/2009 | Rothman et al. | | 713/300 |
| 7,584,374 B2 * | 9/2009 | Gu et al. | | 713/323 |
| 7,634,592 B2 * | 12/2009 | Kadatch et al. | | 710/22 |

(Continued)

FOREIGN PATENT DOCUMENTS

| CN | 1967447 | 5/2007 |
|---|---|---|
| CN | 101211214 | 7/2008 |

OTHER PUBLICATIONS

Definition of "Demand Paging" from Wikipedia, <http://en.wikipedia.org/wiki/Demand_paging>, accessed on Jun. 15, 2011.*

(Continued)

*Primary Examiner* — Khanh Dang
(74) *Attorney, Agent, or Firm* — Richard K. Huffman; James W. Huffman

(57) ABSTRACT

Resuming from a sleep state. A request may received to resume operation of a computer system from a sleep state to an executing state. A restoring process may be initiated to restore the computer system to an executing state. The restoring process may include loading information from a nonvolatile memory medium to a computer system memory medium. A request may be received from a processor of the computer system to access the computer system memory medium. The request may require access to a portion of the computer system memory medium in the executing state, and may be received prior to completion of the restoring process. It may be determined if the portion of the computer system memory medium has been restored. If the portion of the computer system memory medium has not been restored, the portion of the computer system memory medium may be restored from the nonvolatile memory medium ahead of other portions in the restoring process.

18 Claims, 4 Drawing Sheets

U.S. PATENT DOCUMENTS

| | | |
|---|---|---|
| 7,681,058 B2 | 3/2010 | Kimura |
| 7,793,127 B2 * | 9/2010 | Gu et al. ............. 713/323 |
| 7,900,074 B2 * | 3/2011 | Reece et al. ............. 713/323 |
| 2006/0059380 A1 | 3/2006 | Kimura |
| 2007/0106853 A1 | 5/2007 | Evanchik et al. |
| 2007/0150651 A1 * | 6/2007 | Nemiroff et al. ............. 711/114 |
| 2007/0234028 A1 * | 10/2007 | Rothman et al. ............. 713/1 |
| 2008/0229050 A1 * | 9/2008 | Tillgren ............. 711/200 |
| 2009/0150625 A1 * | 6/2009 | Evanchik et al. ............. 711/159 |
| 2010/0131789 A1 | 5/2010 | Kimura |

OTHER PUBLICATIONS

Sleep States, Intel AMT Implementation and Reference Guide, copyrighted 2006-2012.*

* cited by examiner

METHOD AND CONTROLLER FOR POWER MANAGEMENT

PRIORITY INFORMATION

This application claims benefit of priority of U.S. provisional application Ser. No. 61/095,029 titled "A Low Power Fast Resume Method" filed Sep. 8, 2008, whose inventor is Jiin Lai, as well as U.S. provisional application Ser. No. 61/095,032 titled "Quickly Resuming Mechanism for Non-Volatile Sleep State" filed Sep. 8, 2008, whose inventor is Hawk Wu, both of which are hereby incorporated by reference in their entirety as though fully and completely set forth herein.

The present application is also related to U.S. patent application Ser. No. 12/358,441, filed on Jan. 23, 2009.

FIELD OF THE INVENTION

The present invention relates to the field of computers, and more particularly to a method and a controller for power management.

DESCRIPTION OF THE RELATED ART

In recent years, the ability of computers to enter a sleep state (e.g., to conserve power, such as for portable computers) and awaken from sleep states quickly has become important. For example, a user may not wish to shut down the computer and then wait the typically long period of time required for boot up of the computer.

In present computer systems (e.g., ones using the Microsoft Windows™ operating system), various sleep states are used to reduce power consumption (e.g., sleep states defined by the Advanced Configuration and Power Interface Specification (ACPI)). For example, an S3 state (Suspend to RAM) is used to reduce the system start up time from suspend. The S3 sleep state is a low wake latency (e.g., five seconds or less) sleep state where most system context is lost except for system memory and some CPU and L2 configuration context. The system memory content is maintained by performing periodic self-refresh procedures, while other portions of the system are powered off (e.g., the processor). However, these memory self-refresh procedures consume power and there is some risk of losing system context (e.g., if power is removed, possibly from low battery power). Thus, the computer may not stay in the S3 state for a long period of time (e.g., if it is a portable computer due to battery constraints), and eventually the system may have to be suspended to disk (S4 state).

The S4 sleep state is a lower power, longer wake latency (e.g., twenty seconds or more) sleep state. In this state, power to all hardware/devices may be removed and the platform context may be maintained. While the S4 state conserves more power than the S3 state, the resume time from the S4 state takes a much longer time than that from the S3 state (e.g., due to the requirement that the S4 state re-initialize the BIOS), which results in a poorer user experience. Thus, more efficient returns from sleep states while keeping power consumption low are desired.

SUMMARY OF THE INVENTION

Various embodiments are presented of a method and a controller for power management.

A computer system may be in an executing state. A request to suspend the computer may be received. Information related to the executed state may be stored to a nonvolatile memory medium in response to the request to enter the sleep state, e.g., from a computer system memory medium. Power may then be suspended to the computer system memory medium.

A request may then be received to resume operation of a computer system from the sleep state to the executing state. A restoring process may be initiated to restore the computer system to the executing state. The restoring process may include loading information from a portion of the nonvolatile memory medium (NVM) (e.g., a hard drive, flash memory, EEPROM memory, etc.) to the computer system memory medium, wherein the portion of the nonvolatile memory medium where the information is stored is not accessible by an operating system of the computer system. For example, the restoring process may include restoring the computer system to a previous executing state, and the information on the NVM may include information for restoring the executing state. In one embodiment, the NVM may store an image of the computer system memory medium. Thus, the computer system may be restored by restoring the executing state previously stored on the NVM. In some embodiments, the restoring process may include using a memory restore request and/or a page restore request. Thus, in one embodiment, the restoring process may include a page restoring process.

A request may be received from a processor of the computer system to access the computer system memory medium. The request to access the computer system memory medium may require access to a portion of the computer system memory medium in the executing state. Receiving the request to access the computer system memory medium may be performed prior to completion of the restoring process. Furthermore, the restoring process may utilize direct memory access (DMA) between the computer system memory and the nonvolatile memory medium.

If the requested portion of the computer system memory medium has not been restored, the portion of the computer system memory medium may be restored from the nonvolatile memory medium ahead of other portions in the restoring process. For example, in one embodiment, the restoring process initiated above may include a memory restore request. The portion of the memory medium requested by the processor may be preferentially restored ahead of the memory restore process using a page restore command. In other words, the page restore command may take priority over the previous memory restore command.

Thus embodiments of the invention may utilize a demand paging technique whereby upon a resume from the sleep state pages requested by the processor are restored ahead of other portions of the memory. This enables the computer system to resume operation faster, as opposed to waiting for the entire execution state to be restored to system memory before allowing operation. In other words, when the user provides input to resume operation from the sleep state, as memory requests are received, those corresponding pages are restored ahead of other pages.

Various embodiments described above may be implemented in hardware or software (e.g., a software program or program instructions stored on a computer accessible memory medium). For example, a controller capable of resuming a system from a sleep state may include one or more inputs, coupled to a processor, which may be configured to receive input from the processor and to receive requests related to system execution states. The controller may further include one or more outputs, coupled to a system memory and a nonvolatile memory, which may be configured to provide output to the system memory and the nonvolatile memory. The controller may be configured to perform the method described above.

BRIEF DESCRIPTION OF THE DRAWINGS

A better understanding of the present invention can be obtained when the following detailed description of the preferred embodiment is considered in conjunction with the following drawings, in which.

Figure 1:
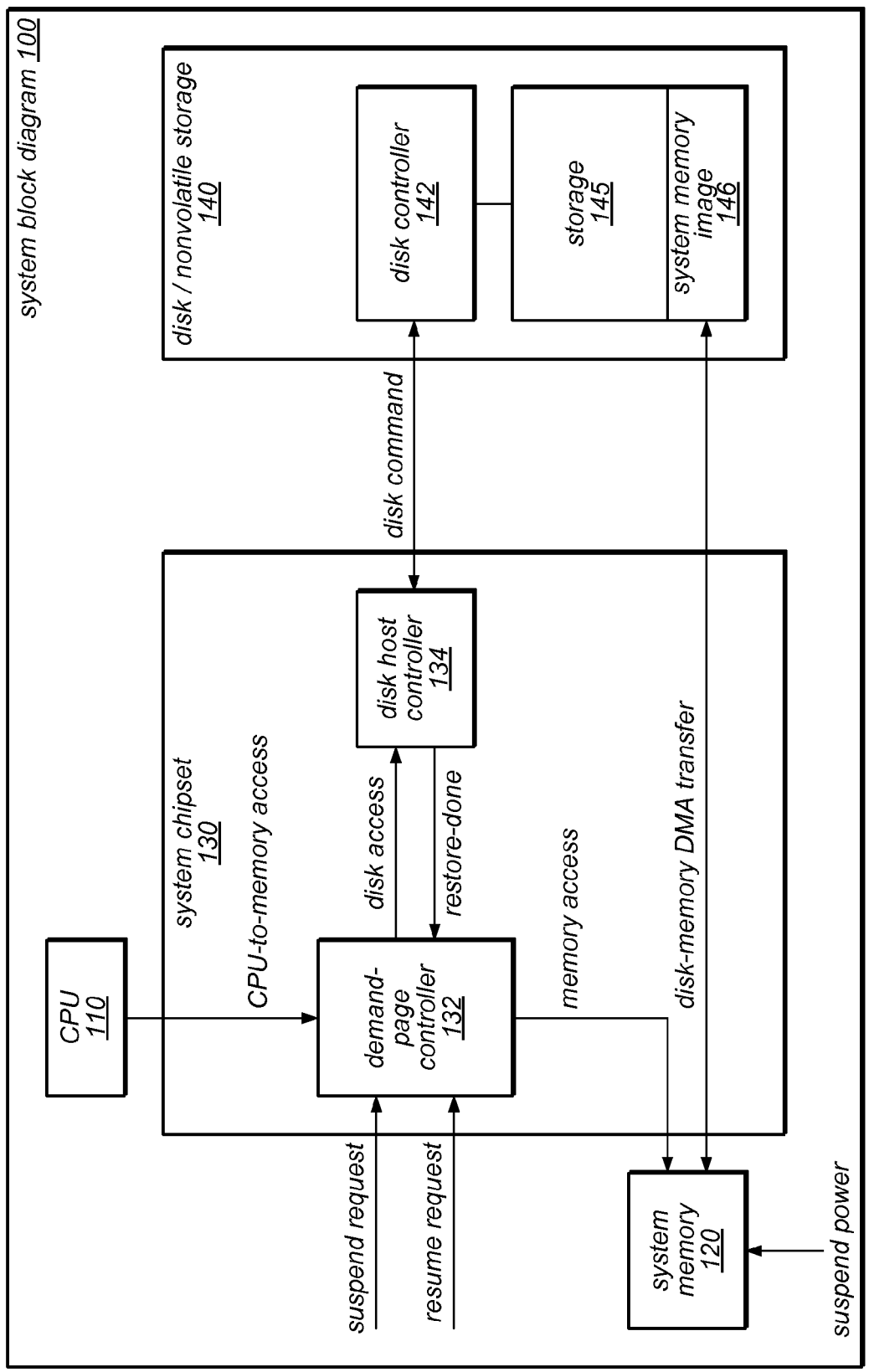
FIG. 1 is an exemplary system capable of entering and resuming from a nonvolatile sleep state, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a nonvolatile memory such as a magnetic media, e.g., a hard drive, flash memory, EEPROM, or optical storage. The memory medium may comprise other types of memory as well, or combinations thereof.

Page—a unit or section of a memory medium. Pages of memory are typically used as units for manipulating data and may be any of various sizes. For example, in an x86 architecture, a page may be 4 kB; however, the size of the page could be programmable and/or size independent of the processor or OS of the computer system.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIG. 1—Exemplary System

FIG. 1 illustrates an exemplary system 100 capable of entering and resuming from a sleep state. The system 100 may be any of various computer systems or devices which may enter and resume from a sleep state. Such states may be particularly useful for systems that rely on battery power, such as portable computers or other portable devices. Thus, the system 100 may be any of various systems.

As shown, the system 100 may include a central processing unit (CPU) 110, although other types of processors are envisioned. The CPU 110 may be one of any of a variety of processing units, such as x86 processors (e.g., produced by Advanced Micro Devices (AMD), Intel, etc.), RISC or ARM processors, and/or other types of processors, as desired.

As shown, the CPU 110 may be coupled to system chipset 130, e.g., to access system memory 120, which is also coupled to system chipset 130. System chipset 130 may include a demand page controller 132 (or other memory controller) that may be coupled to disk host controller 134. Page controller 132 may communicate with the disk host controller 124 in order to provide commands to nonvolatile storage 140. Additionally, page controller 132 may receive suspend and resume requests, according to various embodiments described herein.

Nonvolatile storage or memory (NVM) 140 may include disc controller 142 (e.g., for receiving disk commands from disk host controller 134 of the system chipset 130) as well as storage 145. As also shown, the storage 145 may store a system memory image 146 which may represent the execution state of the system 100 when in a sleep state. In some embodiments, this portion or partition (146) of the nonvolatile storage or memory (NVM) 140 may be dedicated for storing the execution state (or system memory image). The storage partition (such as system memory image) may, in some embodiments, be hidden to the operating system of the system 100. The NVM 140 may be a hard drive, EEPROM or flash memory, and/or any other type of nonvolatile storage.

Note that the elements of FIG. 1 may be configured in a different manner. For example, one or more of the controllers of FIG. 1 could be combined, the elements may be connected in a different manner, and/or additional controllers or elements may be added, as desired.

Figure 2:
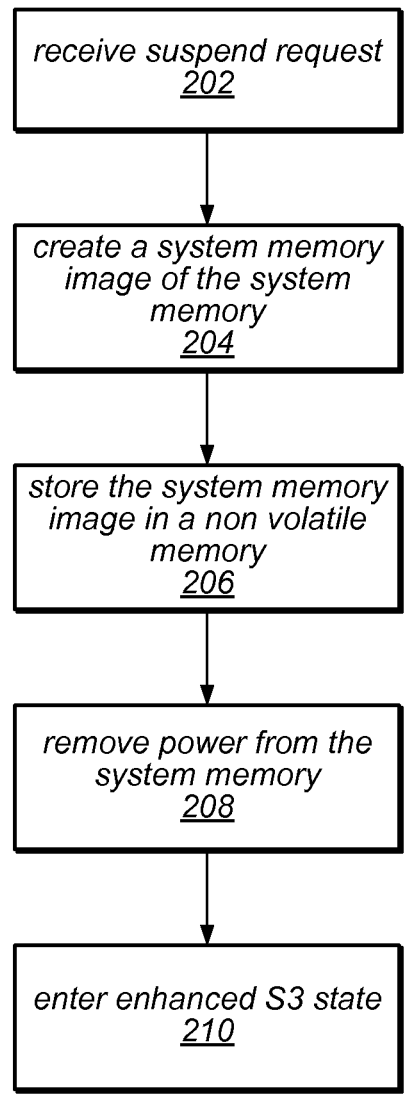
FIG. 2 is a flow chart illustrating an exemplary method for entering a nonvolatile sleep state, according to one embodiment.

FIG. 2—Entering a Nonvolatile Sleep State

FIG. 2 illustrates an exemplary method for entering a nonvolatile sleep state. The method shown in FIG. 2 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 202, a suspend request may be received. In some embodiments, the suspend request may be received by a system chipset, such as the system chipset 130 described above. Alternatively, the suspend request may be received by another element of the system which controls suspension or resumption of an active execution state. In one embodiment, the suspend request may be received from the operating system of the system. More specifically, the operating system may generate the suspend request via the CPU, which may write a specific value to a specific I/O address. The chipset may then decode the I/O address and correspondingly start the suspension process, as described below.

The suspend request may be received in response to various actions. For example, the suspend request may be in response to a user requesting that the computer or device enter the suspend state (e.g., by pressing a hibernate button). Accordingly, as indicated above, the operating system may provide the suspend request. Alternatively, the suspend request may be received in response to an automatic detection. For example, the computer or device may have settings (e.g., power saver settings) which stipulate that after a period of inactivity, the system should enter a sleep state. Accordingly, the suspend request may be transmitted and received in 202 when such a condition is reached.

In 204, a disk host controller (or NVM controller) may be programmed to create a system memory image of the system memory (e.g., the random access memory of the system). Said another way, the current execution state of the system may be stored, e.g., in a NVM. In some embodiments, this may be achieved by simply copying the entirety of the system memory to the NVM. The copy may be performed using direct memory access (DMA) between the system memory and the NVM. In 206, the system memory image may be created or stored. Note that various other contexts may be stored for entering the sleep state. For example, some CPU and L2 configuration contexts may be stored, e.g., in the NVM.

In 208, power (e.g., memory suspend power) may be removed from the system memory. This may result in the loss of all stored memory in the system memory. Thus, by storing the image of the system memory in the NVM, the system memory may no longer require to be powered, thus allowing power savings. This may be especially relevant to systems which rely on battery power, such as laptop computers or portable devices. Thus, in 210, the system may enter an enhanced S3 state which may resume faster than resuming from the S4 state, while also reducing power consumption (similar to the S4 state). Note that further benefits of the S3 enhanced state (e.g., over the S3 state and the S4 state) are provided below.

Figure 3:
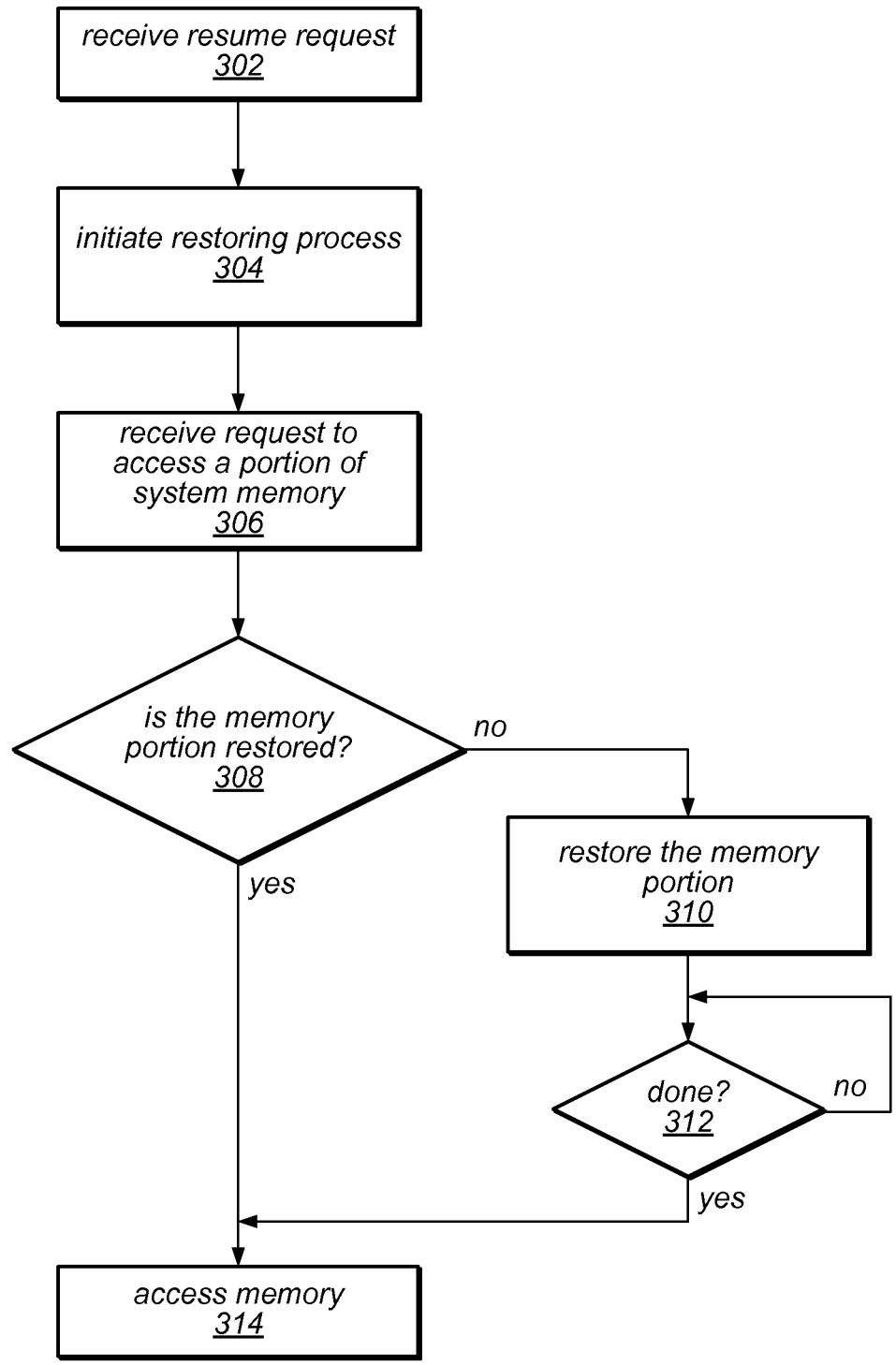
FIG. 3 is a flow chart illustrating an exemplary method for resuming from a nonvolatile sleep state, according to one embodiment.

FIG. 3—Resuming from a Nonvolatile Sleep State

FIG. 3 illustrates an exemplary method for resuming from a nonvolatile sleep state. The method shown in FIG. 3 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 302, a request to resume operation of a computer system or device from a sleep state to an executing state may be received. The request may be received by a controller, such as the demand page controller 132 described above. In some embodiments, control may begin from the reset vector of the processor of the system. The sleep state may be the one entered in 208 above. The request to resume operation of the system may be received in response to various actions. For example, a user of the system may wish to begin using the system, which may require "waking" the system from the sleep state. In one embodiment, the user may press a key or interact with the system in some way to wake the system from the sleep state. In response, the request to resume operation may be transmitted and received in 302. The request to resume may come from various components of the system, e.g., in response to a user pressing the power button or hibernate button of the system, the user interacting with an I/O device (e.g., a mouse or keyboard), etc.

In 304, a restoring process may be initiated to restore the system to the executing state. The restoring process may include restoring power to various components of the system. In one embodiment, the restoring process may include sending a memory restore command to an NVM controller. The memory restore command may load information, e.g., an image of the system memory, stored on the NVM into the system memory, e.g., starting at the lowest address and continuing until the system memory is fully restored to the execution state. Thus, the memory restore may be used to restore all of the system memory (e.g., according to a particular method, such as lowest address to highest address). Alternatively, the restoring process may include using page restore commands to restore pages of the system memory. Thus, the page restore command may be used to restore a portion (a page) of system memory, and can be used in an iterative or on-demand method. Note that various memory restoration processes are envisioned. As indicated above, the image of the system memory may be stored in a dedicated partition of the NVM, which may not be accessible or known by the operating system of the system.

Furthermore, the restoring process may include restoring other contexts (e.g., other than just the system memory from the NVM), such as portions (or all of) CPU and L2 configuration contexts, among other possibilities. In some embodiments, the information stored in the NVM may include these additional configuration contexts. Thus, the restoring process may include restoring the system memory as well as other contexts, which may be stored in the NVM.

Thus, the restoring process may restore the system to the execution state prior to entering the sleep state (e.g., the state of the system prior to the suspend request in 202 above). As indicated above, the restoring process may restore the system to the executing state using the information for restoring the execution state previously stored on the NVM. In some embodiments, the restoring process may include utilizing direct memory access (DMA) between the system memory and the NVM controller to transfer the information or system memory image. The DMA transfer may be initiated by the demand page controller, the disk host controller, and/or the NVM disk controller, described above, among other possibilities. As indicated above, the NVM may be flash memory, a hard drive, or any other type of nonvolatile memory medium.

In 306, a request may be received to access the system memory. The request may be received from a processor of the system. Alternatively, the request may be received from a controller (e.g., the demand page controller described above). The controller may, for example, know or predict which pages of information the processor will request, and correspondingly provide the request in 306. For example, when entering the sleep state, the controller may store or record which particular pages of memory the processor or system had been using, and then restore those pages first, possibly before the processor requests them. In another embodiment, the controller may be aware of the processor request address through a configuration process or a list of preferred or priority restore addresses.

In some embodiments, the page of the access request may be stored in a page register (e.g., in the Northbridge). The request in 306 may be received before completion of the restoring process of 304. The request to access the system memory may require access to a portion of the system memory in the executing state. For example, the request may be a memory request for a specific memory address of the system memory where information was stored in the execution state (and which is being restored by the restoring process in 304). In some embodiments, the specific memory address may be determined, e.g., based on the required page. Alternatively, the request may simply include the memory address.

In 308, it may be determined if the portion of the system memory referenced by the request in 306 has been restored by the restoring process in 304. If the portion has been restored, the system memory may be accessed according to conventional methods (314).

However, if the portion has not been restored, that portion of the system memory may be restored ahead of other portions in the restoring process, thereby allowing the processor to access that data with a minimal delay. In some embodiments, the portion of the system memory may be restored using a page memory request, e.g., by the dynamic page controller. Thus, in some embodiments, the page memory request may take precedence or priority over the memory restoration process of 304 (e.g., the memory restore command of 304, although other types of restore processes are envisioned for the restoring process). Thus, memory portions may be restored using a "demand paging" method, where those portions of memory which are requested (e.g., for access by the processor) are restored ahead of other non-requested portions of memory. Thus, the memory access in 314 may be delayed until the portion of memory has been restored, as shown by the decision "done?" 312.

By this method, the system may be able to start running or executing without waiting for the entirety of the system memory to be restored from disk, which would be required when restoring from a typical S4 sleep state.

Figure 4:
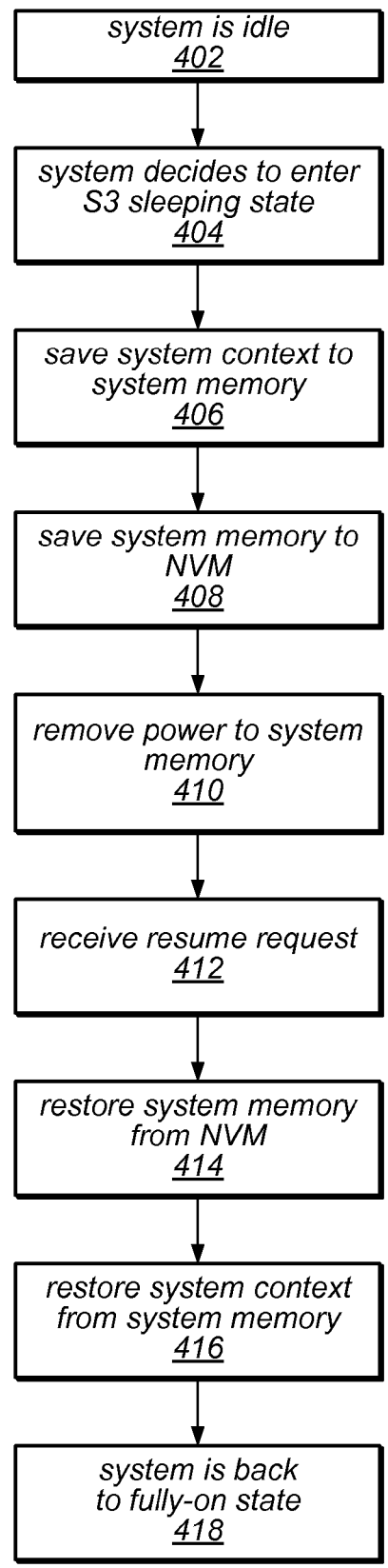
FIG. 4 is a flow chart illustrating an exemplary method for entering and resuming from a nonvolatile sleep state, according to one embodiment.

FIG. 4—Entering and Resuming from a Nonvolatile Sleep State

FIG. 4 illustrates an exemplary method for entering and resuming from a nonvolatile sleep state. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. Note that any details described for FIG. 4 may be applied to FIGS. 2 and 3, and similarly, any details from FIGS. 2 and 3 may be applied to the method below. As shown, this method may operate as follows.

In 402, the system may become idle or the system may otherwise enter or receive a condition indicating that the system should go to sleep.

In 404, the system may decide to enter a first sleep state, e.g., an S3 sleep state (used for the first sleep state below), or otherwise receive a request to enter the first sleep state, e.g., based on 402. For example, if the idle time of the system reaches a threshold, the system may then decide to enter the S3 state accordingly. Alternatively, a user may request that the system enter a sleep state (e.g., by selecting "hibernate" or "sleep" options), and the system may correspondingly initiate the process to enter the S3 state. In some embodiments, the system may assert a command for asking the system to enter the first sleep state based on the decision in 404.

In some embodiments, the chipset or firmware (or other controller) may interrupt the command, e.g., using an I/O trap for entering a system management mode (SMM) mode, in order to enter a second sleep state, e.g., an enhanced S3 state (used for the second sleep state below). More specifically, upon detection of the processor of the system accessing the I/O trap (a specific I/O address appointed by the BIOS), the chipset or firmware may send a system management interrupt (SMI) signal for the processor. Upon receiving the SMI, the processor may enter the SMM where the BIOS or firmware can take control of the system, e.g., to enter the enhanced S3 state.

In 406, the system may perform one or more functions to enter the S3 sleep state, e.g., according to typical S3 sleep state procedure. For example, the system context may be saved to system memory (e.g., system DRAM). In one embodiment, this save may occur according to typical S3 procedures.

Unlike a typical S3 sleep state, in 408, the BIOS or firmware may save the system memory context to the NVM based on the system in SMM. Alternatively, or additionally, an image of the system memory may be saved to the NVM, possibly along with other contexts, such as CPU and/or L2 contexts. In some embodiments, the BIOS or firmware may perform this step based on interrupting the command to enter the S3 state, described above. Furthermore, in some embodiments, the system context may simply be saved to NVM and saving to the system memory (in 406) may be skipped.

In 410, the BIOS or firmware may shut down the system to enter the extended S3 sleep state based on the system in SMM. More specifically, power for refreshing the system memory may be removed, as indicated in FIG. 2 above. However, unlike the typical S4 state, the BIOS may not need to be restarted when resuming from the enhanced S3 state, e.g., because the system in SMM may be controlled by the BIOS or firmware. Additionally, in some embodiments, the system may believe it is in simply an S3 state, when it is actually in an enhanced S3 state. In alternate embodiments, the system may believe it is in an S4 state, when it is actually in the enhanced S3 state. In further embodiments, the system may be aware that it has entered the enhanced S3 state, and the system in SMM may be controlled by the BIOS or firmware.

In 412, the system may receive a resume request or otherwise begin waking up from the sleep state. Depending on what sleep state the system "thinks" it is in, the resume request may be for that sleep state. For example, the system may believe it is in the S3 sleep state when it is in fact in the enhanced S3 sleep state. In such cases, the resume request may be to wake up from the S3 sleep state rather than the enhanced S3 sleep state. However, in some embodiments, the system may be aware that it is in the enhanced S3 sleep state, and the resume request may be to resume from that state.

In some embodiments, the resume request may be received by the firmware or chipset. For example, the resume request may be received from various components of the system, e.g., in response to a user pressing the power button or hibernate button of the system, the user interacting with an I/O device (e.g., a mouse or keyboard), etc. Alternatively, or additionally, the processor of the system may simply request access to the system memory and the system may resume operation based on the memory request.

In 414, the system may begin restoring system memory context from the NVM, e.g., to the system memory. In some embodiments, this may restore the system to the S3 sleep state (from the enhanced S3 sleep state). However, in alternate embodiments, the system may not resume to the S3 sleep state, but may instead wake directly from the enhanced S3 sleep state (even if the system or OS "thinks" that the system is in the normal S3 sleep state). More specifically, in this embodiment, the processor may be supplied with power while the system memory context is being restored from the NVM.

In 416, the system may perform one or more processes to resume the system. For example, the system context may be restored from the system memory, e.g., according to typical S3 resume procedures. Where the system has entered the S3 sleep state from the enhanced S3 sleep state, the system may wake according to all of the conventional S3 resume procedures. In some embodiments, one or both of 414 and 416 may utilize the demand paging feature described above in FIG. 3.

In 418, the system may enter a fully functional executing state.

ADVANTAGES OF THE METHOD

Previous systems (e.g., Microsoft Windows™ systems) allowed for entering and resuming from the S3 or S4 suspend states. Using the above methods, an enhanced S3 state is achieved, which allows for the benefits of both states. In more specific embodiments (e.g., those described in FIG. 3), by using the dynamic restore feature described above, the system may be able to resume from the enhanced S3 state as quickly as (or nearly as quickly as) the S3 state, but may not require the power for refreshing the memory as in the S3 state. Thus, the enhanced S3 state may include both the advantages of the S3 state (quick resume) and the S4 state (power conservation).

Furthermore, there may be some additional differences between enhanced S3 and other sleep states. For example, in enhanced S3 the BIOS may perform writing operations (e.g., to the NVM) rather than the OS in S4. Additionally, in enhanced S3, all system content is lost but memory content is kept (under the definition of S3), as opposed to storing all system content in a file, as in S4. Additionally, a context marker may not be required for enhanced S3 that would have been required for S4. (This is indicated in page 20 of the ACPI Specification, which states "If the system has been commanded to enter S4, the OS will write all system content to a file on non-volatile storage media and leave the appropriate context maker". The ACPI Specification is hereby incorporated by reference as if fully set forth herein Finally, as indicated above, the portion of the NVM that stores the system memory image may be hidden from the OS, which may believe it is simply in S3 rather than the enhanced S3 state it may actually be in. Finally, DMA may be used to transfer data directly between the system memory and NVM, which may not be performed for typical S4 or S3 resume processes.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for resuming from a sleep state, as defined by the Advanced Configuration and Power Interface (ACPI) specification, the method comprising:
   receiving a request to resume operation of a computer system from a sleep state to an executing state;
   initiating a restoring process to restore the computer system to the executing state, wherein the restoring process comprises loading information from a portion of a nonvolatile memory medium to a computer system memory medium using demand paging, wherein the portion of the nonvolatile memory medium where the information is stored is not accessible by an operating system of the computer system, and wherein the restoring process comprises:
     restoring the computer system to the executing state using the information for restoring the executing state previously stored on the nonvolatile memory medium, and wherein the information comprises an L2 configuration context; and
   receiving a request to access the computer system memory medium, wherein the request to access the computer system memory medium requires access to a portion of the computer system memory medium in the executing state, wherein said receiving the request to access the computer system memory medium is performed prior to completion of the restoring process.

2. The method of claim 1, wherein the restoring process comprises a page memory restoring process.

3. The method of claim 1, further comprising:
   determining if the portion of the computer system memory medium has been restored; and
   if the portion of the computer system memory medium has not been restored, restoring the portion of the computer system memory medium from the nonvolatile memory medium ahead of other portions in the restoring process.

4. The method of claim 3, wherein the restoring process comprises a memory restore command, and wherein said restoring the portion of the computer system memory medium in the restore process ahead of the other portions comprises using a page restore command which takes priority over the previous memory restore command.

5. The method of claim 1, wherein the restoring process utilizes direct memory access between the computer system memory medium and the nonvolatile memory medium.

6. The method of claim 1, further comprising:
   receiving a request to suspend the computer system;
   storing the information in the nonvolatile memory in response to the request; and
   suspending power to the computer system memory medium.

7. The method of claim 1, wherein the information comprises an image of the system memory medium in the executing state.

8. A controller capable of resuming a system from a sleep state, as defined by the Advanced Configuration and Power Interface (ACPI) specification, the controller comprising:
   one or more inputs of the controller, coupled to a processor, configured to receive input from the processor and to receive requests related to system execution states; and
   one or more outputs of the controller, coupled to a system memory and a nonvolatile memory, configured to provide output to the system memory and the nonvolatile memory responsive to the input received from the processor;
   wherein the controller is configured to:
     receive a request to resume operation of the system from the sleep state to an executing state via the one or more inputs;
     begin a restoring process to restore the system to the executing state, wherein the restoring process comprises using the one or more outputs to initiate loading of information from a portion of the nonvolatile memory to the system memory using demand paging, and wherein the portion of the nonvolatile memory where the information is stored is not accessible by an operating system of the processor, and wherein the restoring process comprises;
     restoring the system to the executing state using the information for restoring the executing state previously stored on the nonvolatile memory, and wherein the information comprises an L2 configuration context; and
     receive a request to access a portion of the system memory via the one or more inputs, wherein the request refers to an address of the system memory in the executing state, and wherein said receiving the request is performed prior to completion of the restoring process.

9. The controller of claim 8, wherein the restoring process comprises a page memory restoring process.

10. The controller of claim 8, wherein the controller is further configured to:
   determine if the portion of the memory has been restored; and
   if the portion of the memory has not been restored, initiate restoration the portion of the memory ahead of other potions of the memory in the restoring process.

11. The controller of claim 10, wherein said beginning the restoring process comprises transmitting a memory restore command, and wherein said initiating restoration of the portion of the system memory in the restore process ahead of the other portions comprises using a page restore command which takes priority over the previous memory restore command.

12. The controller of claim 8, wherein the restoring process utilizes direct memory access between the system memory and the nonvolatile memory.

13. The controller of claim 8, wherein the controller is further configured to:
   receive a request to suspend the computer system via the one or more inputs;
   store the information in the nonvolatile memory in response to the request; and
   initiate suspension of power to the system memory.

14. The controller of claim 8, wherein the information comprises an image of the system memory in the executing state.

15. A system capable of power management, comprising:
   a processor;
   a nonvolatile memory medium coupled to the processor;
   a system memory medium coupled to the processor, wherein the processor is configured to:
      in response to a request to enter a sleep state for a system, perform one or more functions to enter the sleep state in response to the request to enter the sleep state, wherein the sleep state is defined by the Advanced Configuration and Power Interface (ACPI) specification;
      store context of the system memory medium in the nonvolatile memory in response to the request to enter the sleep state; and
      remove power to the system memory medium after said storing the context of the system memory medium in the NVM in response to the request to enter the sleep state; and
   a system chipset coupled to the processor, the nonvolatile memory medium, and the system memory medium, wherein the system chipset is configured to:
      in response to a request to resume operation of the system from the sleep state to an executing state, begin a restoring process to restore the system to the executing state, wherein the restoring process comprises loading information from a portion of the nonvolatile memory medium to the system memory medium using demand paging, and wherein the portion of the nonvolatile memory medium where the information is stored is not accessible by an operating system of the processor, and wherein the restoring process comprises;
         restoring the system to the executing state using the information for restoring the executing state previously stored on the nonvolatile memory, and wherein the information comprises an L2 configuration context.

16. The system of claim 15, the system chipset is further configured to:
   receive a request to access a portion of the system memory, wherein the request refers to an address of the system memory in the executing state, and wherein said receiving the request is performed prior to completion of the restoring process.

17. The system of claim 16, the system chipset is further configured to:
   determine if the portion of the system memory medium has been restored; and
   if the portion of the memory has not been restored, restoring the portion of the system memory medium ahead of other potions of the system memory medium in the restore process.

18. The system of claim 15, wherein the nonvolatile memory medium comprises flash memory.

* * * * *